(12) United States Patent
Park et al.

(10) Patent No.: US 8,305,970 B2
(45) Date of Patent: Nov. 6, 2012

(54) METHOD OF TRANSMITTING A MEASUREMENT REPORT IN A WIRELESS MOBILE COMMUNICATIONS SYSTEM

(75) Inventors: Sung-Jun Park, Gyeonggi-Do (KR); Young-Dae Lee, Gyeonggi-Do (KR); Sung-Duck Chun, Gyeonggi-Do (KR); Myung-Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 684 days.

(21) Appl. No.: 12/092,054

(22) PCT Filed: Sep. 15, 2006

(86) PCT No.: PCT/KR2006/003700
§ 371 (c)(1),
(2), (4) Date: Apr. 29, 2008

(87) PCT Pub. No.: WO2007/066883
PCT Pub. Date: Jun. 14, 2007

(65) Prior Publication Data
US 2008/0293423 A1 Nov. 27, 2008

Related U.S. Application Data

(60) Provisional application No. 60/732,080, filed on Oct. 31, 2005.

(30) Foreign Application Priority Data

Jul. 5, 2006 (KR) .................. 10-2006-0063137

(51) Int. Cl.
*H04Q 7/00* (2006.01)
*H04L 12/28* (2006.01)

(52) U.S. Cl. .................. 370/329; 370/392; 370/395.42; 370/431

(58) Field of Classification Search .................. None
See application file for complete search history.

(56) References Cited

U.S. PATENT DOCUMENTS

| 5,697,055 A | 12/1997 | Gilhousen et al. |
| 6,359,867 B1 | 3/2002 | Ali-Vehmas |
| 6,532,225 B1 | 3/2003 | Chang et al. |
| 6,628,946 B1 | 9/2003 | Wiberg et al. |

(Continued)

FOREIGN PATENT DOCUMENTS

CN 1505912 6/2004

(Continued)

OTHER PUBLICATIONS

NTT DoCoMo, et al, "Multiplexing Method of Shared Control Channel in Uplink Single-Carrier FDMA Radio Access," TSG-RAN WG1#42bis, R1-051143, Oct. 10, 2005.

(Continued)

*Primary Examiner* — Yemane Mesfin
*Assistant Examiner* — Christine Duong
(74) *Attorney, Agent, or Firm* — Lee, Hong, Degerman, Kang & Waimey

(57) ABSTRACT

In a wireless mobile communications system, a method of transmitting a measurement report to a network. The network transmits in advance, a message including the allocated uplink radio resources and the like, to the terminal so that the terminal can transmit the measurement report to the network using the previously allocated uplink radio resources, thereby minimizing a time for transmitting the measurement report to the network.

11 Claims, 3 Drawing Sheets

U.S. PATENT DOCUMENTS

| | | |
|---|---|---|
| 6,845,238 B1 * | 1/2005 | Muller ................ 455/436 |
| 6,920,155 B2 | 7/2005 | Rao |
| 6,968,192 B2 | 11/2005 | Nokia |
| 7,106,814 B2 | 9/2006 | Carsello |
| 7,123,910 B2 * | 10/2006 | Lucidarme et al. ........ 455/434 |
| 7,430,420 B2 * | 9/2008 | Derakhshan et al. ...... 455/452.2 |
| 7,471,948 B2 | 12/2008 | Farnsworth et al. |
| 7,535,846 B2 * | 5/2009 | Kim et al. ............ 370/241 |
| 7,809,373 B2 | 10/2010 | Park et al. |
| 7,983,676 B2 | 7/2011 | Ju et al. |
| 8,134,974 B2 | 3/2012 | Chun et al. |
| 2001/0016496 A1 | 8/2001 | Lee |
| 2001/0026543 A1 | 10/2001 | Hwang et al. |
| 2001/0030956 A1 | 10/2001 | Chillariga et al. |
| 2001/0036113 A1 * | 11/2001 | Jurgensen et al. ........ 365/200 |
| 2002/0045448 A1 | 4/2002 | Park et al. |
| 2002/0048266 A1 | 4/2002 | Choi et al. |
| 2002/0051431 A1 | 5/2002 | Choi et al. |
| 2002/0052206 A1 | 5/2002 | Longoni |
| 2002/0071480 A1 | 6/2002 | Marjelund et al. |
| 2002/0085516 A1 | 7/2002 | Bridgelall |
| 2002/0122393 A1 * | 9/2002 | Caldwell et al. ......... 370/328 |
| 2002/0159412 A1 | 10/2002 | Odenwalder et al. |
| 2002/0181436 A1 | 12/2002 | Mueckenheim |
| 2003/0002472 A1 | 1/2003 | Choi et al. |
| 2003/0026324 A1 | 2/2003 | Li et al. |
| 2003/0035440 A1 | 2/2003 | Casaccia et al. |
| 2003/0053344 A1 | 3/2003 | Herrmann |
| 2003/0054829 A1 | 3/2003 | Moisio |
| 2003/0076812 A1 | 4/2003 | Benedittis |
| 2003/0081586 A1 | 5/2003 | Malladi et al. |
| 2003/0095550 A1 | 5/2003 | Bernhard et al. |
| 2003/0095552 A1 | 5/2003 | Bernhard et al. |
| 2003/0131300 A1 | 7/2003 | Park et al. |
| 2003/0202489 A1 | 10/2003 | Lee |
| 2003/0207696 A1 | 11/2003 | Willenegger et al. |
| 2004/0009767 A1 | 1/2004 | Lee et al. |
| 2004/0022217 A1 | 2/2004 | Korpela et al. |
| 2004/0029532 A1 | 2/2004 | Schwarz et al. |
| 2004/0053614 A1 | 3/2004 | Il-Gyu et al. |
| 2004/0085926 A1 | 5/2004 | Hwang et al. |
| 2004/0103435 A1 | 5/2004 | Yi et al. |
| 2004/0114574 A1 * | 6/2004 | Zeira et al. ............ 370/352 |
| 2004/0127244 A1 | 7/2004 | Matsumoto et al. |
| 2004/0152478 A1 | 8/2004 | Ruohonen et al. |
| 2004/0162072 A1 | 8/2004 | Sigle et al. |
| 2004/0171401 A1 * | 9/2004 | Balachandran et al. ...... 455/522 |
| 2004/0185852 A1 | 9/2004 | Son et al. |
| 2005/0059437 A1 | 3/2005 | Son et al. |
| 2005/0094586 A1 | 5/2005 | Zhang et al. |
| 2005/0105488 A1 | 5/2005 | Raji et al. |
| 2005/0105505 A1 | 5/2005 | Fishler et al. |
| 2005/0107105 A1 | 5/2005 | Wakabayashi |
| 2005/0119004 A1 | 6/2005 | Gao et al. |
| 2005/0138528 A1 | 6/2005 | Ameigeiras et al. |
| 2005/0159161 A1 | 7/2005 | Florkey et al. |
| 2005/0177623 A1 | 8/2005 | Roberts et al. |
| 2005/0181801 A1 | 8/2005 | Funnell |
| 2005/0197132 A1 | 9/2005 | Lee et al. |
| 2005/0227691 A1 | 10/2005 | Pecen et al. |
| 2005/0271025 A1 | 12/2005 | Guethaus et al. |
| 2005/0282547 A1 | 12/2005 | Kim et al. |
| 2006/0039327 A1 | 2/2006 | Samuel et al. |
| 2006/0056355 A1 | 3/2006 | Love et al. |
| 2007/0010268 A1 | 1/2007 | Kim et al. |
| 2007/0032255 A1 | 2/2007 | Koo |
| 2007/0117563 A1 | 5/2007 | Terry et al. |
| 2007/0133458 A1 | 6/2007 | Chandra et al. |
| 2007/0147315 A1 | 6/2007 | Khoury et al. |
| 2007/0155388 A1 | 7/2007 | Petrovic et al. |
| 2008/0062905 A1 | 3/2008 | Goldberg et al. |
| 2008/0123585 A1 | 5/2008 | Granzow et al. |
| 2008/0254800 A1 | 10/2008 | Chun et al. |
| 2008/0268852 A1 * | 10/2008 | Petrovic et al. ........... 455/442 |
| 2008/0287138 A1 | 11/2008 | Yoon et al. |
| 2009/0207810 A1 | 8/2009 | Petrovic et al. |

FOREIGN PATENT DOCUMENTS

| | | |
|---|---|---|
| EP | 1220490 | 7/2002 |
| EP | 1326460 | 7/2003 |
| EP | 1505782 | 2/2005 |
| EP | 1519519 | 3/2005 |
| EP | 1553798 | 7/2005 |
| EP | 1565026 | 8/2005 |
| GB | 2332340 | 12/1997 |
| JP | 09-186704 | 7/1997 |
| JP | 10-136426 | 5/1998 |
| JP | 11-146462 | 5/1999 |
| JP | 11-196477 | 7/1999 |
| JP | 11-341541 | 12/1999 |
| JP | 2000-069531 | 3/2000 |
| JP | 2001-078246 | 3/2001 |
| JP | 2001-313968 | 11/2001 |
| JP | 2003-500950 | 1/2003 |
| JP | 2003-087842 | 3/2003 |
| JP | 2003102055 | 4/2003 |
| JP | 2003-152600 | 5/2003 |
| JP | 2003324761 | 11/2003 |
| JP | 2004-135287 | 4/2004 |
| JP | 2004-208177 | 7/2004 |
| JP | 2004-221760 | 8/2004 |
| JP | 2004-289234 | 10/2004 |
| JP | 2005509313 | 4/2005 |
| JP | 2005-124215 | 5/2005 |
| JP | 2005513907 | 5/2005 |
| JP | 2005-525065 | 8/2005 |
| JP | 2005-237031 | 9/2005 |
| JP | 2005-260337 | 9/2005 |
| JP | 2005-277570 | 10/2005 |
| JP | 2006-507753 | 3/2006 |
| KR | 10-2003-0007481 | 1/2003 |
| KR | 10-2003-0056143 | 7/2003 |
| KR | 1020030080946 | 10/2003 |
| KR | 10-2005-0032285 | 4/2005 |
| KR | 1020050032949 | 4/2005 |
| KR | 10-2005-0032285 | 7/2005 |
| KR | 10-2005-0078635 | 8/2005 |
| KR | 10-2005-0084908 | 8/2005 |
| KR | 1020050078636 | 8/2005 |
| KR | 10-0688303 | 3/2007 |
| RU | 2145774 | 2/2000 |
| RU | 2149518 | 5/2000 |
| RU | 2216100 | 11/2003 |
| WO | 00/72609 | 11/2000 |
| WO | 00/74420 | 12/2000 |
| WO | 01/05121 | 1/2001 |
| WO | 01/35586 | 5/2001 |
| WO | 02/09825 | 2/2002 |
| WO | 0241509 | 5/2002 |
| WO | 03/017544 | 2/2003 |
| WO | 03017544 | 2/2003 |
| WO | 03/088691 | 10/2003 |
| WO | 03/096149 | 11/2003 |
| WO | 03-096731 | 11/2003 |
| WO | 03-103320 | 12/2003 |
| WO | 2004/016016 | 2/2004 |
| WO | 2004/017541 | 2/2004 |
| WO | 2004016007 | 2/2004 |
| WO | 2004-040805 | 5/2004 |
| WO | 2004/089013 | 10/2004 |
| WO | 2005/011134 | 2/2005 |
| WO | 2005/018255 | 2/2005 |
| WO | 2005/060132 | 6/2005 |
| WO | 2005/072073 | 8/2005 |
| WO | 2005/078966 | 8/2005 |
| WO | 2005/083912 | 9/2005 |
| WO | 2005/089002 | 9/2005 |

OTHER PUBLICATIONS

LG Electronics, "Functions of E-RRC and E-MAC," TSG-RAN Working Group 2 #48bis, R2-052768, Oct. 10, 2005.

Seizo Onoe, Jun Tajima, Takanori Utano and Narumi Umeda; "Control Channel Structure for TDMA Mobile Radio Systems;" NTT Radio Communication systems laboratories, p. 270-275; 1-2356, Take, Yokosuka, 239, Japan; 1990 IEEE.

Onoe, et al., "Control Channel Structure for TDMA Mobile Radio Systems," 40th IEEE Vehicular Technology Conference, May 6, 1990, pp. 270-275.

3rd Generation Partnership Project (3GPP); "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7 .0.0, Jun. 2006.

Nokia, "Intra-radio access mobility, Handover in LTE_Active", R2-060053, 3GPP TSG-RAN WG2#50, Jan. 2006.

Nokia et al., "Intra_LTE Handover Operation", R2-061135, 3GPP TSG-RAN WG2 Meeting#53, May 2006.

NTT DoCoMo et al., "Physical Channels and Multiplexing in Evolved UTRA Downlink", R1-050707, 3GPP TSG RAN WG1 #42 on LTE, Aug. 2005.

NTT DoCoMo, "Physical Channel Structures for Evolved UTRA", R1-050464, 3GPP TSG RAN WG1 Meeting #41, May 2005.

Nokia et al., "E-UTRA Transport Channels", R2-052438, 3GPP TSG-RAN WG2 Meeting#48bis, Oct. 2005.

IEEE Standard, "Part 16: Air Interface for Fixed Broadband Wireless Access Systems," IEEE Std 802.16, Oct. 2004.

NTT DoCoMo, Inc. et al., "System Information Structure in LTE", R2-062162, 3GPP TSG-RAN WG2 #54, Aug. 2006, XP002465834.

Nokia, "On the DL frequency resource block dimensioning", R1-051091, 3GPP TSG RAN WG1 Meeting #42bis, Oct. 2005, XP050100706.

LG Electronics, "Downlink Channels and Mapping for Evolved UTRA", R2-052393, TSG-RAN Working Group 2 #48bis, Oct. 2005, XP050129506.

Qualcomm Europe, "L2 Buffer Management at E-UTRAN Cell Change", R2-052475, 3GPP TSG-RAN WG2 meeting #48bis, Oct. 2005, XP-002670656.

NEC et al., "EUTRAN handover procedure for LTE_ACTIVE", R3-051106, Joint RAN2-RAN3 #48bis LTE, Oct. 2005, XP-050158616.

Draft Amendment to IEEE Standard for Local and metropolitan area networks, "Part 16: Air Interface for Fixed and Mobile Broadband Wireless Access Systems; Amendment for Physical and Medium Access Control Layers for Combined Fixed and Mobile Operation in Licensed Bands", IEEE P802.16e/D12, Oct. 2005, XP-002670655.

* cited by examiner

METHOD OF TRANSMITTING A MEASUREMENT REPORT IN A WIRELESS MOBILE COMMUNICATIONS SYSTEM

CROSS-REFERENCE TO RELATED APPLICATIONS

This application is a National Stage filing under 35 U.S.C. 371 of International Application No. PCT/KR2006/003700, filed on Sep. 15, 2006, which claims the benefit of earlier filing date and right of priority to Korean Application No. 10-2006-0063137, filed on Jul. 5, 2006, and also claims the benefit of U.S. Provisional Application No. 60/732,080, filed on Oct. 31, 2005.

TECHNICAL FIELD

The present invention relates to wireless (radio) mobile communications systems, and in particular, relates to a method of transmitting a measurement report that allows a faster and more efficient way of transmitting the measurement report to the base station.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or terminal, a UMTS Terrestrial Radio Access Network (UTRAN), and a core network (CN). The UTRAN comprises at least one Radio Network Sub-system (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio Interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows.

The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control layer (RLC) with a service through a logical channel. The RLC layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods.

A RRC connection and a signaling connection will be described in more detail as follows.

In order to perform communications, a terminal needs to have a RRC connection with the UTRAN and a signaling connection with the Core Network (CN). The terminal transmits and/or receives a terminal's control information with the UTRAN or the CN via the RRC connection and the signaling connection.

FIG. 3 shows an exemplary diagram for explaining how a RRC connection is established.

In FIG. 3, to establish the RRC connection, the terminal transmits a RRC Connection Request Message to the RNC, and then the RNC transmits a RRC Connection Setup Message to the terminal in response to the RRC Connection Request Message. After receiving the RRC Connection Setup Message by the terminal, the terminal transmits a RRC Connection Setup Complete Message to the RNC. If the above steps are successfully completed, the terminal establishes the RRC connection with the RNC. After the RRC connection is established, the terminal transmits an Initial Direct Transfer (IDT) message to the RNC for initializing a process of the signaling connection.

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel.

FIG. 4 shows how the physical random access channel (PRACH) power ramping and message transmission may be performed.

Referring to FIG. 4, the PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

FIG. 5 illustrates an exemplary structure of an Acquisition Indicator Channel (AICH).

As shown in FIG. 5, the AICH, which is a downlink physical channel, transmits 16 symbol signatures (Si, i=0, . . . , 15) for the access slot having a length of 5120 chips. The terminal may select any arbitrary signature (Si) from S0 signature to S15 signature, and then transmits the selected signature during the first 4096 chips length. The remaining 1024 chips length is set as a transmission power off period during which no symbol is transmitted. Also, as similar to FIG. 5, the preamble part of the uplink PRACH transmits 16 symbol signatures (Si, i=0, . . . , 15) during the first 4096 chips length.

An Evolved Universal Mobil Telecommunication System (E-UMTS) will be described in more detail as follows.

FIG. 6 shows an exemplary structure of an Evolved Universal Mobile Telecommunications System (E-UMTS). The E-UMTS system is a system that has evolved from the UMTS system, and its standardization work is currently being performed by the 3GPP standards organization.

The E-UMTS network generally comprises at least one mobile terminal (i.e., user equipment: UE), base stations (i.e., Node Bs), a control plane server (CPS) that performs radio (wireless) control functions, a radio resource management (RRM) entity that performs radio resource management functions, a mobility management entity (MME) that performs mobility management functions for a mobile terminal, and an access gateway (AG) that is located at an end of the E-UMTS network and connects with one or more external networks. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

FIG. 7 shows an exemplary architecture of the radio interface protocol between the mobile terminal and the UTRAN (UMTS Terrestrial Radio Access Network). The radio interface protocol of FIG. 7 is horizontally comprised of a physical layer, a data link layer, and a network layer, and vertically comprised of a user plane for transmitting user data and a control plane for transferring control signaling. The radio interface protocol layer of FIG. 2 may be divided into L1 (Layer 1), L2 (Layer 2), and L3 (Layer 3) based upon the lower three layers of the Open System Interconnection (OSI) standards model that is known the field of communication systems.

Particular layers of the radio protocol control plane of FIG. 7 and of the radio protocol user plane of FIG. 8 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIG. 7 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in uplink transmission for transmitting data from the mobile terminal to the network, there is a random access channel (RACH) used for transmitting an initial control message, and a shared channel (SCH) used for transmitting user traffic or control messages. Also, in an uplink transport channel, there is an uplink Shared Control Channel (SCCH) that transmits necessary control information for the terminal to receive the uplink SCH. The uplink SCCH transmission includes information regarding a data variation, a data channel coding technique, and a data size where the data is transmitted to the uplink SCH.

As for channels used in uplink transmission for transmitting data from the mobile terminal to the network, there is a random access channel (RACH) used for transmitting an initial control message, and a shared channel (SCH) used for transmitting user traffic or control messages. Also, in an uplink transport channel, there is an uplink Shared Control Channel (SCCH) that transmits necessary control information for the terminal to receive the uplink SCH. The uplink SCCH transmission includes information regarding a data variation, a data channel coding technique, and a data size where the data is transmitted to the uplink SCH.

DISCLOSURE OF INVENTION

Technical Problem

In a network, the RNC provides various information ("Measurement") To control and/or manage a wireless radio network environment and to support radio resource assignment. The measurement can be performed in various ways (i.e., measurement performed by the terminal, measurement performed by the network). However, the measurement controlled by a RRC message is related to the measurement performed by the terminal. Although a measurement function can be performed by the RNC or a Node B in the UTRAN, such measurement function is performed by the network itself, thus it is not controlled through the RRC message.

The measurement related information is transmitted to the terminal by a measurement control message and/or by system information broadcasting. The terminal reports the measurement results to the UTRAN via a measurement report message periodically or upon the occurrence of event (i.e., user command, setting information, etc.). The measurement control message transmitted by the UTRAN includes various detailed information. Also, different types of measurements can be performed in a particular terminal, and each measurement process is performed independently.

The measurement control information can be transmitted to the terminal in many different ways depending upon a RRC condition of the terminal. Namely, the terminal in an idle mode gets the measurement control information by receiving System Information Block#11 (SIB#11) transmitted via the Broadcasting Channel (BCH), and the terminal in Cell_FACH state, Cell_PCH state, and/or UTR_PCH state gets the measurement control information by receiving System Information Block#12 (SIB#12). Also, if the terminal is in Cell_DCH state, the terminal receives the measurement control information through a Dedicated Control Channel (DCCH).

Technical Solution

The present invention has been developed in order to solve the above described problems of the related art. As a result, the present invention provides a method of transmitting a measurement report to a network by allocating radio resources in advance so that the terminal transmits the measurement report to the network using the previously allocated uplink radio resources.

MODE FOR THE INVENTION

One aspect of the present invention is the recognition by the present inventors regarding the problems and drawbacks of the related art described above and explained in more detail hereafter. Based upon such recognition, the features of the present invention have been developed.

In the related art, terminals transmit a measurement result to a base station when a measurement report is performed. If there is no allocated uplink radio resources to transmit a measurement report message, the terminals need to request uplink radio resources to the base station. Here, the terminal uses a Random Access Channel (RACH) to request the uplink radio resources. However, in the related art when the terminals use the RACH to request the uplink radio resources, the time for the measurement report is increased because of the possibility for the RACH collision between the terminals (i.e. the same signature is selected from multiple terminals that using of the RACH).

In contrast, the features of the present invention provides that the base station transmits the uplink radio resource to the terminal in advance (i.e., before the terminal transmits a measurement report, before the terminal transmits a RACH setup request to the base station) through a certain message, and then the terminal transmits the measurement report message to the base station using the previously allocated uplink radio resource. As a result, the terminal may transmit the measurement report to the base station with a minimized delay of time.

It should be noted that the features of the present invention may be related to issues regarding the long-term evolution (LTE) of the 3GPP standard. As such, the 3GPP standard and its related sections or portions thereof, as well as various developing enhancements thereof pertain to the present invention.

Figure 1:
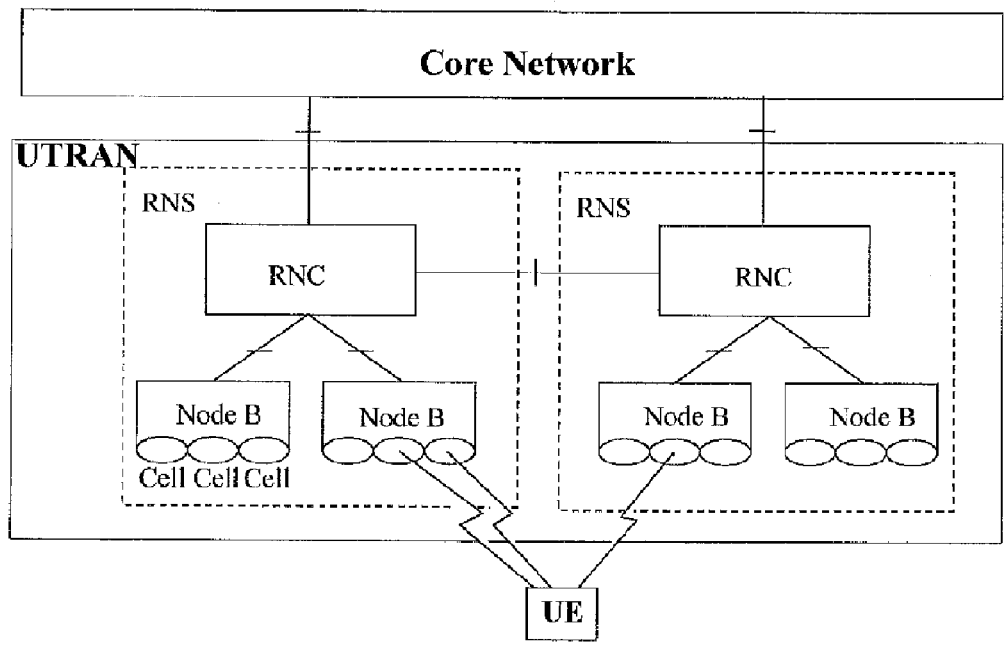
FIG. 1 shows an exemplary diagram illustrating an Universal Mobile Telecommunication System (UMTS) network of a conventional mobile communication system.
Figure 2:
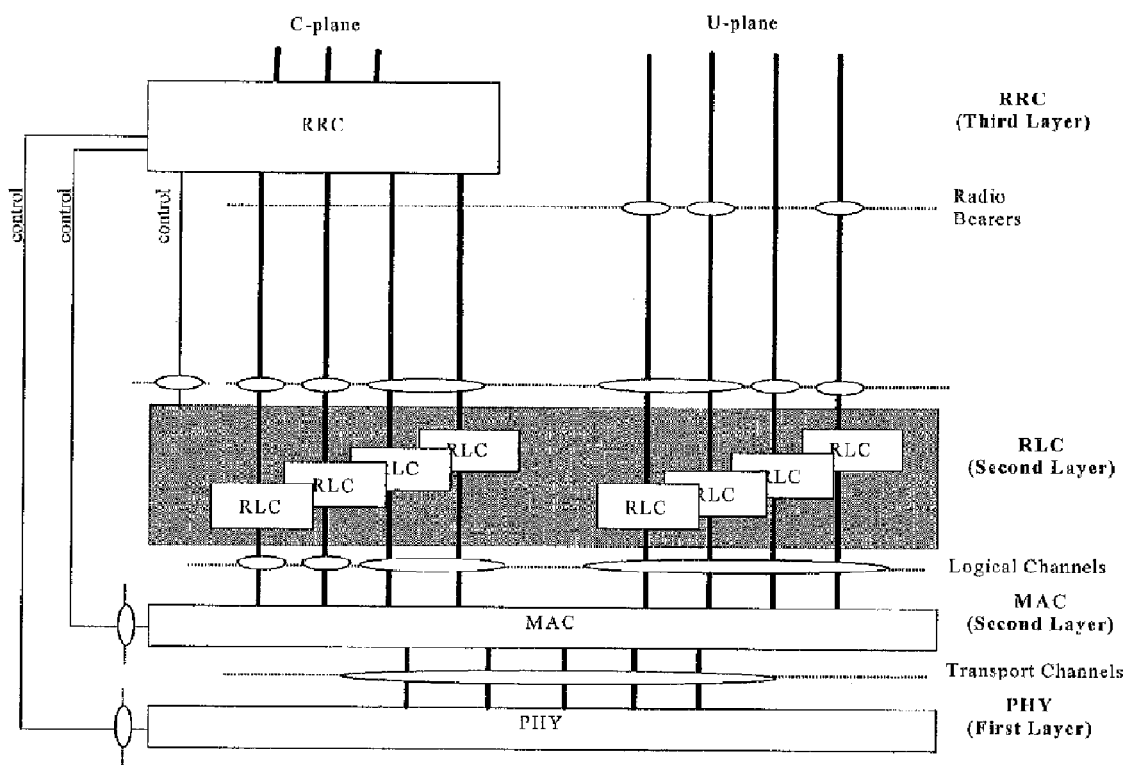
FIG. 2 shows an exemplary diagram illustrating a structure of a Radio Interface Protocol (RIP) between a UE and the UTRAN.
Figure 3:
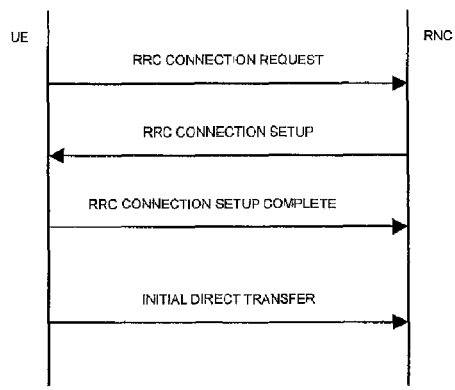
FIG. 3 shows an exemplary diagram for explaining how a RRC connection is established.
Figure 4:
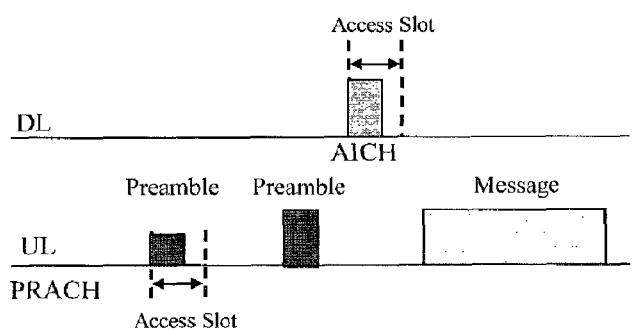
FIG. 4 shows how the physical random access channel (PRACH) power ramping and message transmission may be performed.
Figure 5:
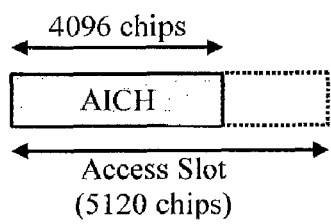
FIG. 5 illustrates an exemplary structure of an Acquisition Indicator Channel (AICH).
Figure 6:
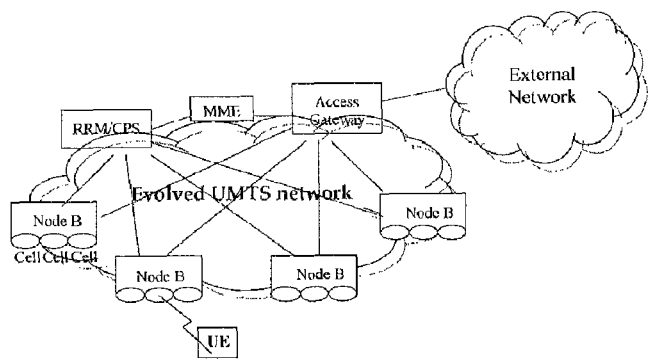
FIG. 6 shows an overview of an E-UMTS network architecture.
Figure 7:
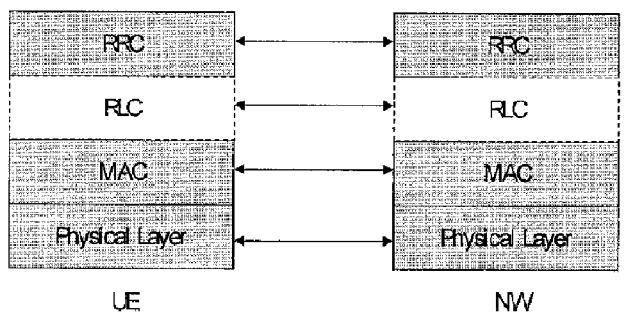
FIGS. 7 and 8 show an exemplary structure (architecture) of a radio interface protocol between a mobile terminal and a UTRAN according to the 3GPP radio access network standard.
Figure 8:
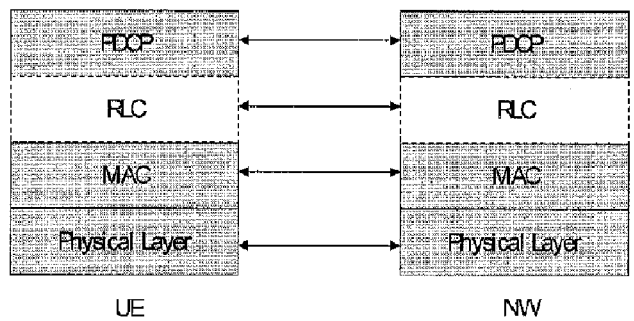
Figure 9:
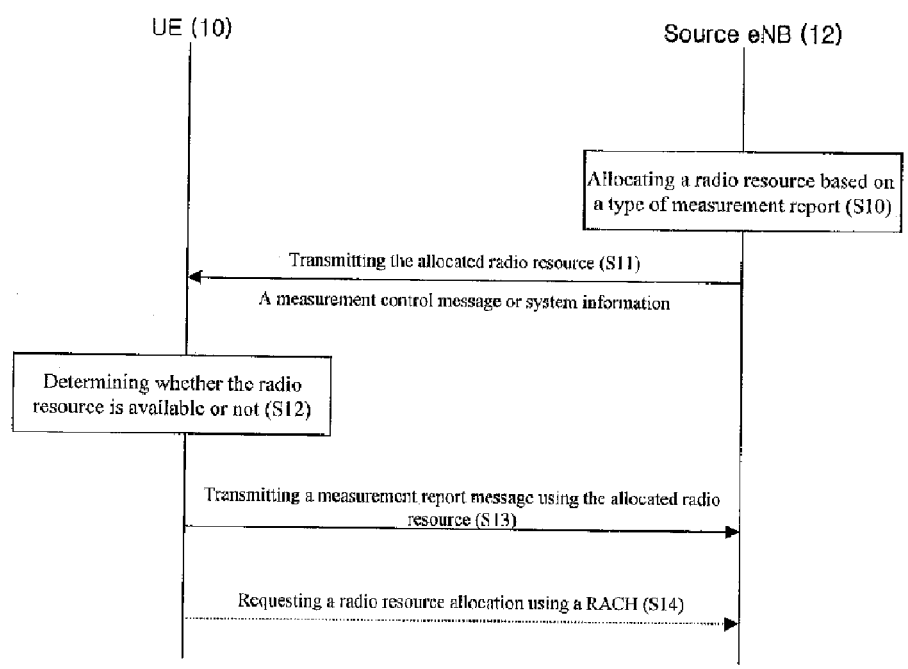
FIG. 9 shows an exemplary diagram for transmitting a measurement report in a mobile communications system according to an exemplary embodiment of the present invention.

FIG. 9 shows an exemplary diagram for transmitting a measurement report in a mobile communications system according to an exemplary embodiment of the present invention.

As shown in FIG. 9, the eNB (20) may decide whether to allocate radio resources in advance based on a type of a measurement reporting. There are various types of measurement reporting. For example, Intra-frequency measurement relates to a measurement for a downlink physical channel state of same frequency, Inter-frequency measurement relates to a measurement for a downlink physical channel state of other frequency, and a traffic volume measurement relates to reporting an uplink traffic amount of the UE (10).

As such, the eNB (20) periodically allocates the radio resources of the uplink in advance when a measurement report is necessary based on the type of the measurement report, (S10) the allocated uplink radio resources are transmitted to the UE via a Measurement Control Message or System Information. (S11)

The UE (10) determines whether the allocated uplink radio resources are available or not. (S12) If there are previously allocated uplink radio resources available, the UE (10) transmits a measurement report message using the previously allocated uplink radio resources. (S13)

Here, it is assumed that the UE (10) transmits traffic data to an uplink. If the eNB (20) has to transmit a measurement reporting message due to a measurement reporting condition setting, the UE (10) transmits the measurement reporting message after transmitting the traffic data or in the form of a piggyback (i.e. including the measurement reporting message into the traffic data). In this case, the measurement reporting message has a lower priority than the traffic data. Also, the UE

(10) may transmit the measurement reporting message first, and then may transmit the traffic data. In this case, the measurement reporting message has a higher priority than the traffic data.

As described above, the UE (10) may transmit the measurement reporting message and the traffic data in the order of their priority. Further, the eNB (20) may set its priority based on the type of measurement reporting.

If the uplink radio resources were not previously allocated, the UE may notify an uplink radio resource request for transmitting the measurement reporting message to the eNB using a RACH. (S14)

As such, as explained in above, the UE performs measurement reporting upon the system information or a measurement control message that transmitted from the eNB. If the previously allocated uplink radio resources are not included (or if the uplink radio resources never been allocated) in the measurement control message or system information, the UE requests radio resources for transmitting the measurement reporting message to the eNB using the RACH.

Also, the UE may notify the eNB that the RACH is being used to allocate the radio resources for the current measurement reporting. Namely, if the UE transmits request information to the eNB by using certain information in the RACH, the eNB may determine which UE performs what type of the measurement reporting, and may transmit proper uplink radio resources to the UE for optimization. Also, the eNB may determine which UE performs what type of the measurement reporting by including certain information within a preamble of the RACH.

It can be said that the present invention provides a method of allocating one or more uplink radio resources in a mobile communication system, the method comprising: allocating the uplink radio resources for a terminal before the terminal transmits a measurement report; transmitting information related to the allocated uplink radio resources to the terminal; receiving the measurement report from the terminal that used the allocated uplink radio resources to transmit the measurement report; determining whether to allocate the uplink radio resources based on a type of the measurement report; assigning a priority for traffic data and a priority for the measurement report based on a type of the measurement report; when the allocated uplink radio resources are not available for the terminal, receiving, from the terminal, an uplink radio resource request, for transmitting the measurement report message via a random access channel (RACH); and determining a type of the measurement report performed by the terminal and transmitting optimized uplink radio resources based on the type of the measurement report, wherein the allocating step is performed by considering a radio environment of multiple terminals that are managed by the network such that interference between two or more terminals are minimized and/or uplink transmission delays are minimized, the measurement report relates to at least one of an Intra-frequency measurement, an Inter-frequency measurement, and a traffic volume measurement, the uplink radio resources are allocated periodically, at least one of a measurement control message and system information that are transmitted to the terminal includes the allocated uplink radio resources, and the optimized uplink radio resources include certain information within a preamble of a random access channel (RACH).

The present invention also may provide a method of transmitting a measurement report in a mobile communication system, the method comprising: receiving information regarding uplink radio resources from a network, wherein the uplink radio resources are allocated in the network before the terminal transmits a measurement report; transmitting the measurement report to the network using the received uplink radio resources; transmitting a measurement report prior to the transmission of traffic data, transmitting the measurement report after the transmission of the traffic data, or transmitting the measurement report in a piggyback format; and if there are no uplink radio resources available, transmitting an uplink radio resource request to the network for transmitting the measurement report message via a random access channel (RACH), wherein at least one of a measurement control message and system information that transmitted from the network includes the received uplink radio resources, the measurement report is performed periodically, and the measurement report and traffic data are transmitted based on their priority.

It can be said that the present invention provides a mobile terminal for transmitting a measurement report in a mobile communications system, the mobile terminal comprising: a radio protocol entity adapted to receive information regarding uplink radio resources from a network and to transmit a measurement report to the network using the uplink radio resources, wherein the uplink radio resources are allocated in the network before the terminal transmits the measurement report.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of allocating one or more uplink radio resources in a mobile communication system, the method comprising:
   allocating the one or more uplink radio resources for a terminal before a measurement report is transmitted by the terminal;
   transmitting measurement control information to the terminal before the measurement report is transmitted by the terminal, wherein the measurement control information is related to the allocated one or more uplink radio resources and is transmitted via a System Information Block 11 (SIB 11) or a System Information Block 12 (SIB 12);
   receiving the measurement report from the terminal via the allocated one or more uplink radio resources;
   determining a type of the measurement report transmitted by the terminal;
   transmitting information related to optimized uplink radio resources to the terminal based on the determined type of the measurement report; and
   assigning a priority for traffic data and a priority for the measurement report based on the determined type of the measurement report,
   wherein the information related to the optimized uplink radio resources includes certain information within a preamble of a random access channel (RACH), and
   wherein the method further comprises receiving, from the terminal, an uplink radio resource request when the allocated one or more uplink radio resources are not available for the terminal, the uplink radio resource request for transmitting the measurement report via the RACH.

2. The method of claim 1, wherein allocating the one or more uplink radio resources comprises considering a radio environment of a plurality of terminals that are managed by a network.

3. The method of claim 1, further comprising:
   determining whether to allocate the one or more uplink radio resources based on the determined type of the measurement report.

4. The method of claim 1, wherein the measurement report relates to at least an Intra-frequency measurement, an Inter-frequency measurement, or a traffic volume measurement.

5. The method of claim 1, wherein the one or more uplink radio resources are allocated periodically.

6. The method of claim 1, wherein transmitting the measurement control information comprises transmitting to the terminal at least a measurement control message or system information indicating the allocated one or more uplink radio resources.

7. A method of transmitting a measurement report in a mobile communication system, the method comprising:
   receiving, by a terminal, measurement control information from a network, wherein the measurement control information regards one or more allocated uplink radio resources and is received via a System Information Block 11 (SIB 11) or a System Information Block 12 (SIB 12) before the terminal transmits a measurement report;
   transmitting the measurement report to a network using the received one or more allocated uplink radio resources;
   receiving, by the terminal, information related to optimized uplink radio resources from the network; and
   transmitting traffic data to the network,
   wherein a priority of the measurement report and the traffic data is based on a determined type of the measurement report, and
   wherein the information related to the optimized uplink radio resources includes certain information within a preamble of a random access channel (RACH), the information related to the optimized uplink radio resources based on the determined type of the measurement report, and
   wherein the method further comprises transmitting an uplink radio resource request to the network if no uplink radio resources are available, the uplink radio resource request for transmitting the measurement report via the RACH.

8. The method of claim 7, wherein receiving the measurement control information comprises receiving at least a measurement control message or system information indicating the one or more allocated uplink radio resources.

9. The method of claim 7, wherein the transmission of the measurement report is performed periodically.

10. The method of claim 7, wherein transmitting the measurement report comprises transmitting the measurement report prior to a transmission of traffic data, transmitting the measurement report after the transmission of the traffic data, or transmitting the measurement report in a piggyback format.

11. A mobile terminal for transmitting a measurement report in a mobile communications system, the mobile terminal comprising:
   a processor adapted to receive measurement control information from a network, wherein the measurement control information regards one or more allocated uplink radio resources and is received via a System Information Block 11 (SIB 11) or a System Information Block 12 (SIB 12) before the mobile terminal transmits a measurement report, to transmit the measurement report to the network using the one or more allocated uplink radio resources, to receive information related to optimized uplink radio resources from the network, and to transmit traffic data,
   wherein a priority of the measurement report and the traffic data is based on a determined type of the measurement report,
   wherein the information related to the optimized uplink radio resources includes certain information within a preamble of a random access channel (RACH), the information related to the optimized uplink radio resources based on the determined type of the measurement report, and
   wherein the processor is further adapted to transmit an uplink radio resource request to the network if no uplink radio resources are available, the uplink radio resource request for transmitting the measurement report via the RACH.

* * * * *